Patented June 8, 1948

2,443,081

UNITED STATES PATENT OFFICE 2,443,081

ADHESIVE CEMENTS

George M. Rapp, New Haven, Conn., assignor to John B. Pierce Foundation, New York, N. Y., a corporation of New York No Drawing. Application July 1, 1944,
Serial No. 543,215

1 Claim. (Cl. 106—76)

This invention relates to adhesive cements.

In particular, the invention is concerned with providing the art with an adhesive cement having qualities superior to heretofore existing adhesive cements, especially in its use as a surface coating, for protecting against the weather and for mechanically strengthening base material to which it is applied, and as an adhesive, for securing membranous material to base material or for bonding together the laminae of structural laminates.

There is a need for an economical adhesive cement, particularly in the low-cost housing field, which may be used as above-mentioned without the disadvantages attached to the employment of ordinary, so-called incompatible adhesive cements, that is, cements which are not compatible with the base material or laminae either structurally, physically, or compositionally.

Where there is structural incompatibility, it is usually due to an inadequate stiffness ratio for properly strengthening the construction, the stiffness ratio being the ratio of the modulus of elasticity of the adhesive cement to the modulus of elasticity of the base material.

For example, it is impossible to properly strengthen or reinforce relatively rigid base slabs of aerated or other light-weight concrete, porous burned clay products, or cellulated glass, all of which have a high modulus of elasticity, by the application of hot or cold mastic compositions having a relatively low modulus of elasticity. Likewise, it is impossible to develop potentially adequate strength and elasticity of pre-formed or membranous surfacings, such as asbestos-cement boards and other sheets of composition material, when such surfacings are used in structural laminates.

Physical incompatibility refers to the attribute that the adhesive cement is insufficiently extensible or plastic to "cushion-out" or absorb differential volume changes between the adhesive cement and the base material, whether caused in the drying or curing stage, or, later, by temperature changes. Typical of this are the expansion failures of wet gypsum plasters on an unyielding base, the map cracking of cement stucco on a hard base, and the tearing of glass by the shrinkage of hard cements or glues.

By compositional incompatibility is meant the chemical or physical differences of the adhesive cement as respects the base material. Representative of this is the retardation or prevention of set of certain types of urea-formaldehyde adhesives on an alkaline base, and the failure of Portland cement to adhere efficiently to hot asphalt films.

A primary object of the invention, therefore, is the production of a high quality and economical adhesive cement which is compatible structurally, physically, and compositionally with many types of structural base material.

A further object is the production of an improved adhesive cement which is plastic and chemically setting, essentially constant in volume during setting and hardening, and of high strength, high water-resistance, and incombustible when set.

In order to effect a substantial decrease in shrinkage during setting over usual types of adhesive cements, the water requirement of the presently disclosed adhesive cement mixture is greatly reduced over what is customary in the art. This may be accomplished by the use of a waterproof plasticizer, and extender or filler, together with a suitable wetting agent for same.

An advantageous waterproof plasticizer, and extender or filler, for the purpose provided by the product disclosed in U. S. Patent No. 1,989,892, granted to Albert Sommer under date of February 5, 1935, entitled "Method and apparatus for producing pulverulent building material with bituminous constituents," later re-issued as Re. 20,119, on September 22, 1936, and U. S. Patent No. 2,125,860, granted to Albert Sommer under date of August 2, 1938, entitled "Process and apparatus for producing a pulverulent building material," which comprises a suitably processed mixture of a finely divided, dry, intimate, dispersion of a coalesced bituminous or resinous thermoplastic substance and a finely ground, dry, inorganic, granular or fibrous material. This product may, for convenience, be spoken of as a "Straba" mixture. The wetting agent is advantageously sodium silicate.

With the waterproof plasticizer, and extender or filler, and the wetting agent therefor, are mixed a principal binding and hardening agent, preferably Portland cement, and sufficient water to form a satisfactory cementitious mixture.

In using the "Straba" mixture, sodium silicate, Portland cement, and water as the principal constituents of the new adhesive cement of the invention, advantages are obtained which would not be had with other materials. The sodium silicate reacts chemically with the Portland cement, and accelerates the rate of set thereof.

It is advantageous that the "Straba" mixture comprise asphalt and dolomitic limestone, and that the sodium silicate be a 1:2 ratio type. In such case, the sodium silicate reacts chemically with the calcium carbonate of the limestone to form insoluble silicates, and also, in wetting the non-absorptive asphalt, replaces the absorbed gas or air films thereon with a reactive, lubricating coating. The asphalt, used as part of the fines of the mixture, adds considerably to the production of a smooth, "fatty" mixture having good water-retaining capacity, that is, freedom from bleeding.

The following is a specific example of a formula, pursuant to the present invention, for producing an asbestos cement which is especially adapted for application to cellular glass base material for forming a surface coating which is hard, structurally strong, and water and weather and fire resistant:

| | Part |
|---|---|
| Portland cement | 1 |
| "Straba" mixture (⅓ part, 240° F. R. & B. softening point asphalt, ⅔ part, 200-mesh dolomitic limestone), 1 part sodium silicate (liquid) Na₂O, 2SiO₂ | ⅛ |
| Water | ¾ |

(All parts proportioned by weight.)

The asbestos cement resulting from mixing together the ingredients set forth above in the proportions specified is plastic, smooth-traveling, and quick-setting. It may be applied to the surfaces of cellular glass insulation and structural units by methods well known and practiced in the plastering art, and it will set and harden without volume changes injurious to the cellular glass. When set and hardened, the coating is sufficiently hard and strong to adequately withstand impact, abrasion, and other kinds of abuse to which a wall structure is subjected, but, because of the asphalt content, is compliable or extensible.

The coated cellular glass may be used as insulating walls in cold storage installations, as exterior walls of buidings, and so forth.

The setting time of the adhesive cement mixture may be varied as desired by varying the sodium silicate content. The sodium silicate may be increased to nearly one-half (½) part by weight of the Portland cement.

The "Straba" mixture may be increased to four (4) parts by weight of the Portland cement, with a corresponding increase in softness of the set and hardened coating, or it may be decreased with just the opposite result.

Where the greater quantities of sodium silicate are used, a slight efflorescence of sodium salts may appear on the surface of the cement coating when exposed to water or moisture. This may be prevented from recurring, and the cement coating may be further improved in water resistance, by brushing it with a dilute acid solution, such as vinegar.

Additional materials may be incorporated in the adhesive cement mixture for various purposes. For producing added bulk, filler and extender materials such as silica sand, marble dust, expanded vermiculite, and asbestos may be employed. For affecting the color, mineral oxide pigments or alberene sawdust may be added. These various additional materials may be either reactive, as far as the sodium silicate is concerned, or inert.

So far as the "Straba" mixture is concerned, various substances that are specifically reactive chemically with sodium silicate may be "bitumated." Examples of such substances are whiting, finely ground silica or diatomaceous earth, fly ash, Portland cement, and certain types of hydrous clays. But the inorganic material "bitumated" need not be reactive chemically with the sodium silicate. In certain instances, it may preferably be inert. Such "Straba" mixtures may comprise varying proportions of bituminous or resinous substance, from five (5) to fifty (50) per cent by weight as compared to the inorganic substance.

The sodium silicate may be any one of available types, considered from the standpoint of soda to silica ratio, and may be in liquid or solid granular form as found desirable in particular instances.

The proportions of all the ingredients of the asbestos cement mixture of the invention may be varied as desired to produce various specific properties and conditions of plasticity or workability.

It will be found that this new and improved asbestos cement of the invention is very useful as an adhesive in the construction of structural luminates. Its properties of chemical setting, high plastic strength, low shrinkage, and controllable set qualify it an especially valuable bonding agent for structural combinations, such as asbestos-cement composition sheeting with cellular glass backing or core.

Whereas, this invention is here described with respect to specific forms thereof, it should be clearly understood that various changes may be made in such specific forms and various other forms may be developed by those skilled in the art without departing from the spirit and generic scope of the invention as set forth herein and in the claim which here follows.

I claim:

An adhesive cement having a modulus of elasticity of the order of that of cellular glass and further possessing the attributes of chemical setting, high plastic strength and low shrinkage upon setting, comprising the following ingredients in substantially the proportions by weight, specified:

| | Parts |
|---|---|
| Portland cement | 1 |
| Mixture of ⅓ part 240° F. R. & B. softening point asphalt, and ⅔ part 200 mesh dolomitic limestone | 1 |
| Sodium silicate, liquid, and of Type Na₂O, 2SiO₂ | ⅛ |
| Water | ¾ |

GEORGE M. RAPP.

REFERENCES CITED

The following references are of record in the file of this patent:

UNITED STATES PATENTS

| Number | Name | Date |
|---|---|---|
| 744,690 | Panzl | Nov. 17, 1903 |
| 1,598,636 | Bartlett | Sept. 7, 1926 |
| 2,274,566 | Sullivan | Feb. 24, 1942 |

FOREIGN PATENTS

| Number | Country | Date |
|---|---|---|
| 31,065 | France | 1926 |
| 150,003 | Austria | 1937 |
| 367,759 | Germany | 1923 |
| 827,614 | France | 1938 |